(12) United States Patent
Allegretti

(10) Patent No.: US 10,604,338 B2
(45) Date of Patent: *Mar. 31, 2020

(54) BULK MATERIAL SHIPPING CONTAINER UNLOADER

(71) Applicant: Arrows Up, LLC, Arlington Heights, IL (US)

(72) Inventor: C. John Allegretti, Barrington Hills, IL (US)

(73) Assignee: Arrows Up, LLC, Arlington Heights, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,456

(22) Filed: Apr. 13, 2018

(65) Prior Publication Data

US 2018/0229926 A1 Aug. 16, 2018

Related U.S. Application Data

(63) Continuation of application No. 15/951,606, filed on Apr. 12, 2018, which is a continuation of application No. 15/489,074, filed on Apr. 17, 2017, which is a continuation of application No. 14/158,158, filed on Jan. 17, 2014, now Pat. No. 9,650,216.

(60) Provisional application No. 61/755,240, filed on Jan. 22, 2013.

(51) Int. Cl.
| | | |
|---|---|---|
| B65D 88/30 | (2006.01) |
| B65G 65/40 | (2006.01) |
| B65D 88/02 | (2006.01) |
| B65D 88/26 | (2006.01) |
| B65D 90/58 | (2006.01) |
| B65D 90/14 | (2006.01) |
| B65D 88/32 | (2006.01) |
| B65D 90/54 | (2006.01) |

(52) U.S. Cl.
CPC ........... B65D 88/30 (2013.01); B65D 88/022 (2013.01); B65D 88/26 (2013.01); B65D 90/14 (2013.01); B65D 90/587 (2013.01); B65G 65/40 (2013.01); B65D 88/32 (2013.01); B65D 90/54 (2013.01)

(58) Field of Classification Search
CPC ...... B65D 90/14; B65D 90/54; B65D 90/587; B65D 88/022; B65D 88/26; B65D 88/32; B65D 88/30; E04G 21/025; B65G 65/40
USPC ...... 222/185.1, 457, 561, 143; 220/629, 636
See application file for complete search history.

(56) References Cited

U.S. PATENT DOCUMENTS

| | | |
|---|---|---|
| 710,611 A | 10/1902 | Ray |
| 917,649 A | 4/1909 | Otto |
| 2,385,245 A | 9/1945 | Willoughby |
| 2,563,470 A | 8/1951 | Kane |
| 2,652,174 A | 9/1953 | Shea et al. |
| 2,670,866 A | 3/1954 | Glesby |
| 2,678,737 A * | 5/1954 | Mangrum ............ B65D 88/128 414/332 |

(Continued)

FOREIGN PATENT DOCUMENTS

| | | |
|---|---|---|
| GB | 2066220 | 7/1981 |
| GB | 2 204 847 | 11/1988 |
| WO | WO 2008/012513 | 1/2008 |

*Primary Examiner* — Charles Cheyney
(74) *Attorney, Agent, or Firm* — Neal, Gerber & Eisenberg LLP

(57) ABSTRACT

A bulk material shipping container unloader having an expandable supporter, a pallet receiver supported by the extendable supporter, and a material director supported by the pallet receiver.

22 Claims, 7 Drawing Sheets

(56) References Cited

U.S. PATENT DOCUMENTS

| | | |
|---|---|---|
| 2,802,603 A | 8/1957 | McCray |
| 3,049,248 A | 8/1962 | Heltzel et al. |
| 3,083,879 A | 4/1963 | Coleman |
| 3,151,779 A | 10/1964 | Rensch et al. |
| 3,318,473 A | 5/1967 | Jones et al. |
| 3,343,688 A | 9/1967 | Ross |
| 3,354,918 A | 11/1967 | Coleman |
| 3,476,270 A | 11/1969 | Cox et al. |
| 3,602,400 A | 8/1971 | Cooke |
| 3,785,534 A | 1/1974 | Smith |
| 3,802,584 A | 4/1974 | Sackett, Sr. et al. |
| 3,986,708 A | 10/1976 | Heltzel et al. |
| 4,023,719 A | 5/1977 | Noyon |
| 4,058,239 A | 11/1977 | Van Mill |
| 4,178,117 A | 12/1979 | Brugler |
| 4,204,773 A | 5/1980 | Bates |
| 4,258,953 A | 3/1981 | Johnson |
| 4,313,708 A * | 2/1982 | Tiliakos ............... B65D 90/14 |
| | | 254/47 |
| 4,398,653 A | 8/1983 | Daloisio |
| 4,626,166 A | 12/1986 | Jolly |
| 4,701,095 A | 10/1987 | Berryman et al. |
| 4,856,681 A | 8/1989 | Murray |
| 4,956,821 A | 9/1990 | Fenelon |
| 4,993,883 A | 2/1991 | Jones |
| 5,036,979 A * | 8/1991 | Selz ............... B65D 19/20 |
| | | 206/386 |
| 5,096,096 A | 3/1992 | Calaunan |
| 5,339,996 A | 8/1994 | Dubbert et al. |
| 5,375,730 A | 12/1994 | Bahr et al. |
| 5,413,154 A | 5/1995 | Hurst, Jr. et al. |
| 5,441,321 A | 8/1995 | Karpisek |
| 5,445,289 A | 8/1995 | Owen |
| 5,722,552 A | 3/1998 | Olson |
| 5,913,459 A * | 6/1999 | Gill ............... B65D 88/26 |
| | | 222/144 |
| 5,927,356 A | 7/1999 | Henderson |
| 5,944,470 A | 8/1999 | Bonerb |
| 5,997,099 A | 12/1999 | Collins |
| 6,059,372 A | 5/2000 | McDonald et al. |
| 6,247,594 B1 | 6/2001 | Garton |
| 6,537,015 B2 * | 3/2003 | Lim ............... B60P 1/6445 |
| | | 410/80 |
| 6,568,567 B2 | 5/2003 | McKensie et al. |
| 6,622,849 B1 | 9/2003 | Sperling |
| 7,008,163 B2 | 3/2006 | Russell |
| 7,086,342 B2 | 8/2006 | O'Neall et al. |
| 7,100,896 B1 * | 9/2006 | Cox ............... B66F 3/44 |
| | | 254/92 |
| 7,252,309 B2 | 8/2007 | Eng Soon et al. |
| 7,284,579 B2 | 10/2007 | Elgan et al. |
| 7,475,796 B2 | 1/2009 | Garton |
| 7,500,817 B2 | 3/2009 | Furrer et al. |
| 7,762,281 B2 | 7/2010 | Schuld |
| 7,997,213 B1 | 8/2011 | Gauthier et al. |
| 8,434,990 B2 | 5/2013 | Claussen |
| 8,505,780 B2 | 8/2013 | Oren |
| 8,545,148 B2 | 10/2013 | Wanek-Pusset et al. |
| 8,573,917 B2 | 11/2013 | Renyer |
| 8,585,341 B1 | 11/2013 | Oren et al. |
| 8,607,289 B2 | 12/2013 | Brown et al. |
| 8,616,370 B2 | 12/2013 | Allegretti et al. |
| 8,622,251 B2 | 1/2014 | Oren |
| 8,668,430 B2 | 3/2014 | Oren et al. |
| 8,827,118 B2 | 9/2014 | Oren |
| 8,887,914 B2 | 11/2014 | Allegretti et al. |
| 9,522,816 B2 | 12/2016 | Taylor |
| 9,580,238 B2 * | 2/2017 | Friesen ............... B65D 88/54 |
| 9,809,381 B2 | 11/2017 | Oren et al. |
| 9,840,366 B2 | 12/2017 | Oren et al. |
| 2009/0078410 A1 | 3/2009 | Krenek et al. |
| 2009/0129903 A1 | 5/2009 | Lyons, III |
| 2009/0314791 A1 | 12/2009 | Hartley et al. |
| 2012/0017812 A1 | 1/2012 | Renyer et al. |
| 2014/0083554 A1 | 3/2014 | Harris |
| 2015/0183578 A9 * | 7/2015 | Oren ............... B65G 65/42 |
| | | 414/288 |
| 2015/0368052 A1 | 12/2015 | Sheesley |
| 2017/0320660 A1 | 11/2017 | Sanders et al. |

\* cited by examiner

BULK MATERIAL SHIPPING CONTAINER UNLOADER

PRIORITY

This application is a continuation application of, claims priority to, and the benefit of U.S. Non-Provisional patent application Ser. No. 15/951,606, filed Apr. 12, 2018, which is a continuation application of, claims priority to, and the benefit of U.S. Non-Provisional patent application Ser. No. 15/489,074, filed Apr. 17, 2017, which is a continuation application of, claims priority to, and the benefit of U.S. Non-Provisional patent application Ser. No. 14/158,158, filed Jan. 17, 2014, now U.S. Pat. No. 9,650,216, issued on May 16, 2017, which claims priority to, and the benefit of U.S. Provisional Patent Application No. 61/755,240, filed Jan. 22, 2013, the entire contents of each of which are incorporated herein by reference.

BACKGROUND

Various bulk material shipping containers are known. Such known material bulk shipping containers, sometimes referred to herein for brevity as known containers or as known bulk containers, are used to transport a wide range of products, parts, components, items, and materials such as, but not limited to, seeds, shavings, fasteners, and granular materials. These are sometimes called loose materials. There are various disadvantages with such known bulk material shipping containers.

For example, one known and widely commercially used known bulk container for shipping materials (such as shipping seeds to farms) is sold by Buckhorn Industries. This known bulk container is made from plastic, weighs about 338 pounds (151.9 kilograms), and holds a maximum of 58.3 cubic feet of material. This known container has a bottom section, a top section, and a cover. To use this known container, loaders at a bulk material supplier must remove the cover, remove the top section from the bottom section, flip the top section upside down, place the flipped top section on the bottom section, fill the container, and then place the cover on the flipped top section. This process requires at least two people and a relatively significant amount of time when filling a large quantity of these containers. In certain instances, specifically configured forklift attachments are required to fill and handle this known container. After this known container is shipped to its ultimate destination (such as a farm), the bulk material (such as seed) is unloaded from the container, and the empty container must be shipped back to the material supplier. However, prior to and for shipping back to the supplier, the cover is removed, the flipped top section is removed from the bottom section, the flipped top section is then flipped back over and placed on the bottom section, and the cover is then placed on the top section and fastened with zip ties. This process also requires at least two people and is relatively time consuming especially for a large quantity of such containers.

Another disadvantage of this known container is that this container is made from plastic and if one or more of the three sections of the container (i.e., the bottom, the top, or the cover) is damaged or cracked, than that entire damaged or cracked section typically must be replaced (instead of being repaired). This adds additional cost, time out of service for the damaged container, and additional material and energy waste.

Another disadvantage of this known container is that when disassembled (for shipping empty), only two of these containers can be stacked on top of each other and still fit in a conventional shipping container or truck. This tends to leave wasted space in such shipping containers and trucks, and thus increases the overall cost of shipping (including related fuel costs) and energy waste.

Additional disadvantages of this known container are that: (a) the cover can be easily lost or misplaced; (b) the cover can be easily damaged; (c) this known container is less weather resistant because the cover is readily removable and only attached by zip ties; (d) the insides and outside surfaces are difficult to clean; (e) a material holding bag is not readily usable with this container, such that this container can not be used for certain types of loose materials; and (f) the contents held by the container can be easily contaminated due in part to the configuration and use of the lid.

To solve these problems, new bulk material shipping containers have been developed, such as those disclosed in U.S. Patent Publication No. 2012/0103848 and U.S. Patent Publication No. 2012/0152798, which are owned by the assignee of the present application.

One issue that has arisen with respect to these new bulk material shipping containers is in the unloading of the materials from these new containers. In various uses, certain of these new bulk material shipping containers need to be supported above the ground to be unloaded. One way this had been done is by using a fork lift to hold the container above the ground in the unloading area during the unloading process. This is not preferred and ties up the use of the fork lift. Another issue that has arisen with respect to these new bulk material shipping containers is that they tend to unload the contents fairly quickly, and thus they may not work optimally in certain situations where the contents need to be unloaded slowly or in batches.

Accordingly, there is a need for a bulk material shipping container unloading apparatus.

SUMMARY

Various embodiments of the present disclosure provide a bulk material shipping container unloader which solves the above issues. The bulk material shipping container unloader of the present disclosure may sometimes be referred herein for brevity as the shipping container unloader, the container unloader, the material unloader, or the unloader.

In one embodiment, the bulk material shipping container unloader of the present disclosure includes: (a) a supporter; (b) a pallet receiver supported by the supporter; and (c) a material director supported by the pallet receiver. In this embodiment, the height of the pallet receiver and the material director are fixed, and thus support the bulk material container at a single position or height.

In another embodiment, the bulk material shipping container unloader of the present disclosure includes: (a) an expandable supporter; (b) a pallet receiver supported by the extendable supporter; and (c) a material director supported by the pallet receiver. The expandable supporter is movable from a retracted position to one or more expanded positions to change the height of the pallet receiver and the material director, and thus to support the bulk material container at different desired positions or heights.

In either of these embodiments, the shipping container unloader of the present disclosure is configured to receive and hold a bulk material shipping container which is configured to directly hold materials or to receive a suitable plastic bag or liner which holds the materials in the container. The shipping container unloader of the present disclosure is configured to hold one shipping container or multiple stacked shipping containers as further discussed below. The shipping container unloader of the present disclosure is also configured to hold one or more expandable shipping containers and/or one or more bulk material shipping containers that are not expandable or retractable.

One embodiment of the shipping container unloader of the present disclosure is primarily made from a suitable steel. In this embodiment, if one of the sections of the unloader is damaged or cracked, that section can typically be repaired which reduces: (a) cost; (b) time out of service for the unloader; and (c) additional material and/or energy waste. In alternative embodiments, the shipping container unloader of the present disclosure or certain parts thereof, can be made from a suitably strong plastic material such as a composite material or a fiber glass material.

Additional features and advantages of the present invention are described in, and will be apparent from, the following Detailed Description of Exemplary Embodiments and the figures.

DETAILED DESCRIPTION OF EXEMPLARY EMBODIMENTS

Figure 6:
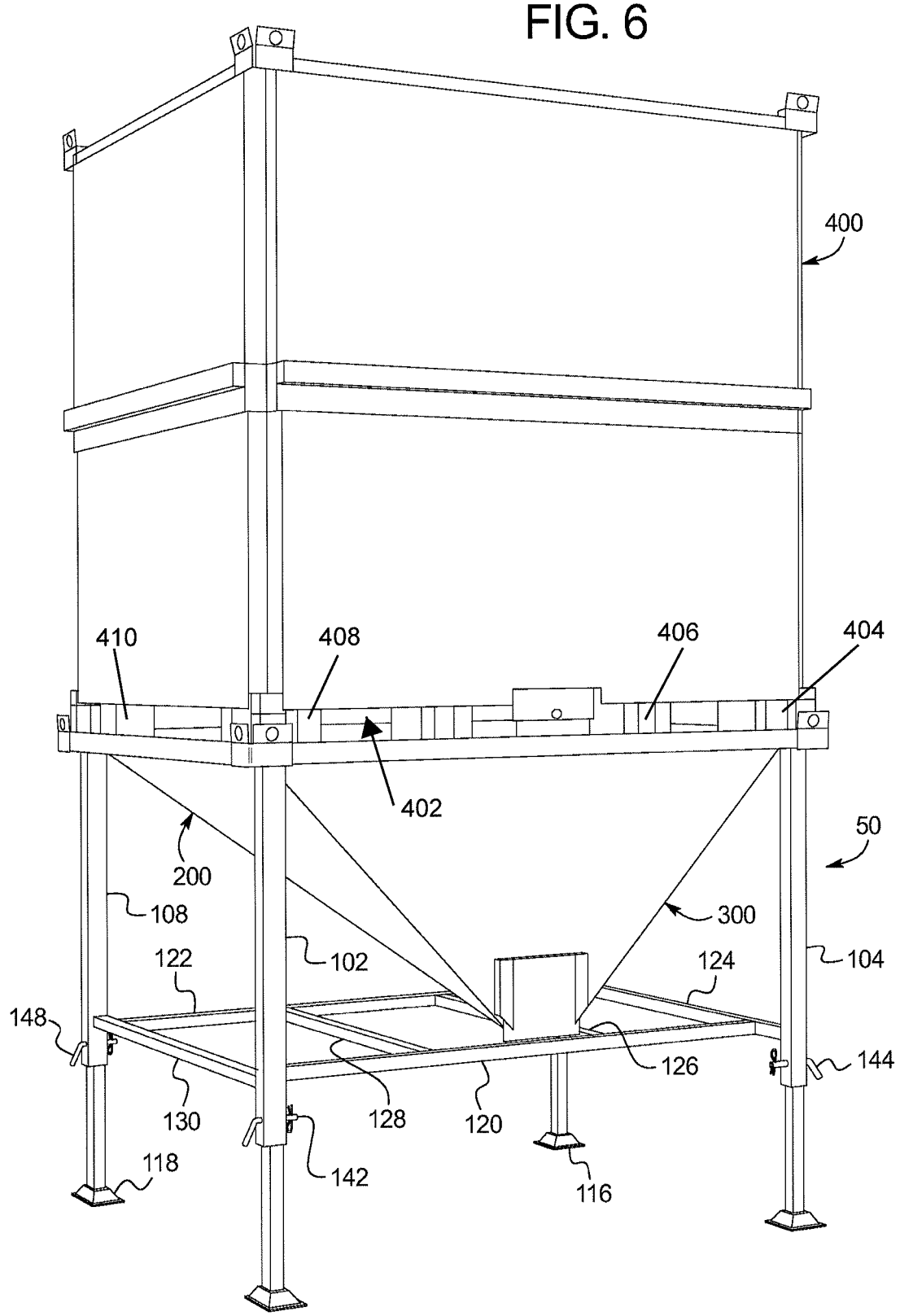
FIG. 6 is a front perspective view of the bulk material shipping container unloader of FIG. 1, shown in an expanded position and shown supporting a bulk material shipping container.
Figure 7:
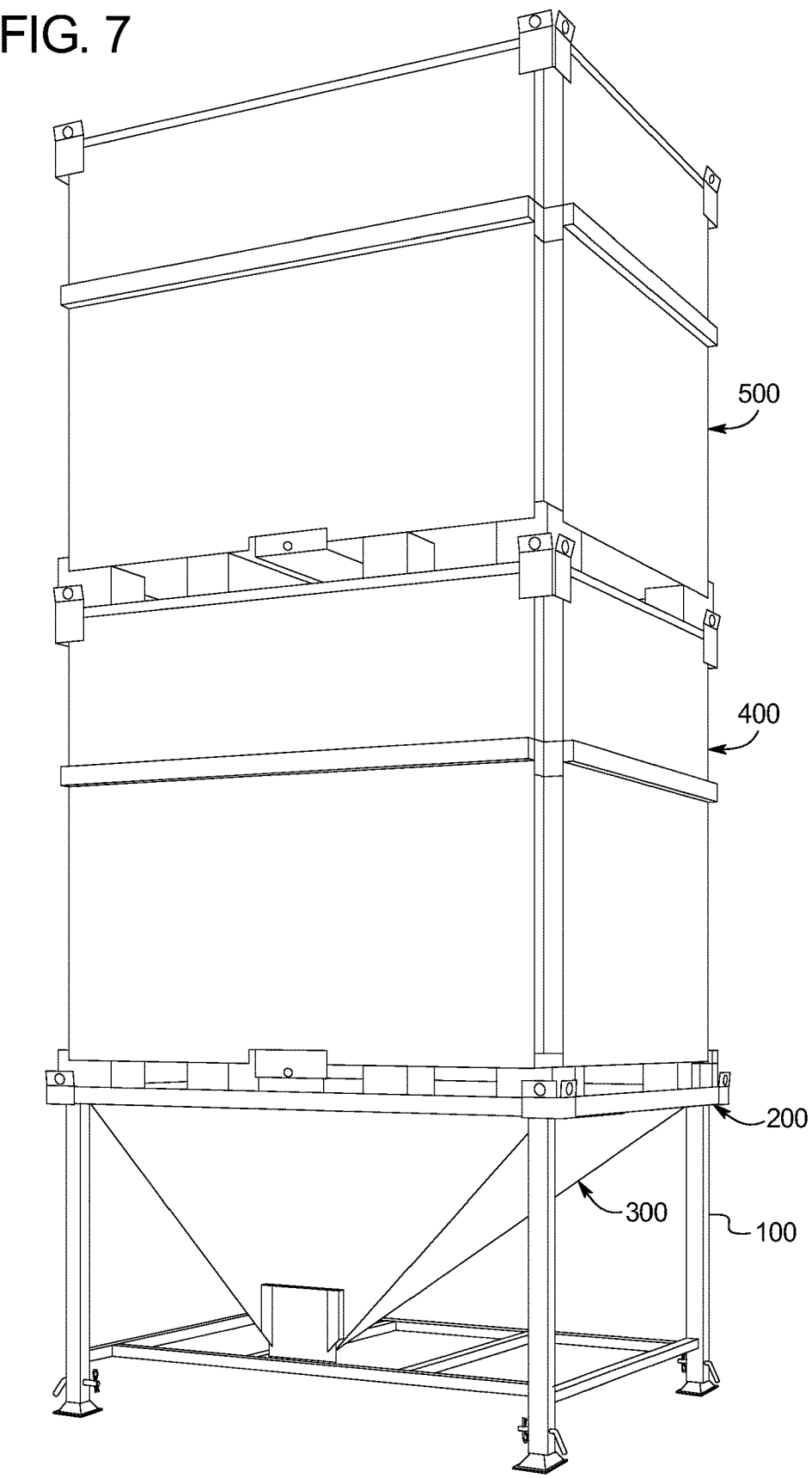
FIG. 7 is a fragmentary front perspective view of the bulk material shipping container unloader of FIG. 1, shown supporting two stacked bulk material shipping containers.

Referring now to the drawings, FIGS. 1 to 7 illustrate one example embodiment of the bulk material shipping container unloader of the present disclosure, which is generally indicated by numeral 50. This illustrated embodiment of the bulk material shipping container unloader 50 generally includes: (a) an expandable or extendable supporter 100; (b) a pallet receiver 200 supported by the expandable or extendable supporter 100; and (c) a material director 300 supported by the pallet receiver 200. Generally, the expandable supporter 100 is configured to support the pallet receiver 200 and the material director 300, the pallet receiver 200 is configured to support one or more bulk material shipping containers 400 and 500 (as shown in FIGS. 6 and 7), and the material director 300 is configured to hold and direct material exiting the bulk material shipping container to and through a material unloading port as further explained below. As mentioned above, for brevity, the bulk material shipping container unloader of the present disclosure is sometimes referred to as the shipping container unloader, the container unloader, the material unloader, or the unloader. It should also be appreciated that while this illustrated embodiment of the unloader is expandable, the bulk material shipping container unloader of the present disclosure does not have to be expandable.

In this illustrated embodiment, the expandable supporter 100 is movable from a retracted position (shown in FIGS. 1, 2, and 3) to one or more expanded positions (shown in FIG. 6) to change the height of the pallet receiver 200 and the material director 300. More specifically, the expandable or extendable supporter 100 includes: (a) expandable legs 102, 104, 106, and 108; (b) feet 112, 114, 116, and 118 respectively attached to the bottom of the legs 102, 104, 106, and 108; (c) leg stabilizers 120, 122, 124, 126, 128, and 130 attached to the legs 102, 104, 106, and 108; and (d) locking members 142, 144, 146, and 148 configured to respectively hold the legs 102, 104, 106, and 108 in the expanded and retracted positions.

In this illustrated embodiment, the expandable legs 102, 104, 106, and 108 each include telescoping upper and lower sections with alignable openings that provide for the expansion or height adjustment of the pallet receiver 200 and material director 300. The locking members 142, 144, 146, and 148 are configured to extend through the aligned openings to hold the legs 102, 104, 106, and 108 in the expanded and retracted positions. In this illustrated embodiment each locking member includes a J-pin (configured to be positioned though aligned openings) and a locking pin which holds the J-pin in place. The J-pins are made from as suitably strong material (such as steel) to support the weight of the containers placed on the unloader 50 when the unloader 50 is in the expanded position. It should be appreciated that other suitable locking members may be employed in accordance with the present disclosure.

In this illustrated embodiment, the legs 102, 104, 106, and 108 and the leg stabilizers 120, 122, 124, 126,128, and 130 are each made from a steel tubular material, and the leg stabilizers are welded to the upper sections of the legs 102, 104, 106, and 108 to provide a suitable support structure for the loader 50. It should also be appreciated that the feet 112, 114, 116, and 118 are also made of steel and welded or otherwise suitably respectively attached to the legs 102, 104, 106, and 108 in this illustrated embodiment.

It should be appreciated that these components are made from steel to: (a) facilitate attachment or connection of these components by welding and/or suitable fasteners; (b) provide structural strength and rigidity; (c) facilitate ease of cleaning; (d) facilitate ease of repair; and (e) minimize overall weight of the unloader. However, it should be appreciated that in alternative embodiments, one or more of these components can be made from other suitably strong materials and can be attached in other suitable manners (besides welding).

The pallet receiver 200 is configured to receive and support a pallet of a bulk material shipping container (as generally shown in FIGS. 6 and 7). More specifically, the pallet receiver 200 includes: (a) pallet support bases 202, 204, 206, and 208; (b) pallet holding walls 212, 214, 216, and 218 respectively connected to and extending upwardly from the pallet support bases 202, 204, 206, and 208; (c) nesting or stacking guides 222, 224, 226, and 228 respectively connected to and extending upwardly from the corners of the pallet holding walls 212, 214, 216, and 218; and (d) nesting supports 232a, 232b, 234a, 234b, 236a, 236b, 238a and 238b, respectively connected to and extending upwardly from the pallet support bases 202, 204, 206, and 208.

In this illustrated embodiment, (a) the pallet support base 202 and the pallet holding wall 212; (b) the pallet support base 204 and the pallet holding wall 214; (c) the pallet support base 206 and the pallet holding wall 216; and (d) the pallet support base 208 and the pallet holding wall 218, are each made of steel, formed together, and respectively welded together at their corners. In this illustrated embodiment, the nesting or stacking guides 222, 224, 226, and 228 are also made of steel and welded to the corners of the pallet holding walls 212, 214, 216, and 218. In this illustrated embodiment, the nesting supports 232a, 232b, 234a, 234b, 236a, 236b, 238a, and 238b, are each made from a steel tube and welded to the pallet support bases 202, 204, 206, and 208.

It should be appreciated that these components are made from steel to: (a) facilitate attachment or connection of these components by welding and/or suitable fasteners; (b) provide structural strength and rigidity; (c) facilitate ease of cleaning; (d) facilitate ease of repair; and (e) minimize overall weight of the unloader. However, it should be appreciated that in alternative embodiments, one or more of these components can be made from other suitably strong materials and can be attached in other suitable manners (besides welding).

It should be appreciated that when a container sits on the unloader 50 as generally illustrated in FIGS. 6 and 7, the pallet of the container rests on the nesting supports 232a, 232b, 234a, 234b, 236a, 236b, 238a, and 238b, which are configured to support the pallet and specifically the legs or footing of the pallet of the container. The nesting supports direct the weight of the second or top container that sits on those nesting supports to the corners of the unloader and thus to the legs of the unloader. This prevents the weight of the container from damaging the walls of the unloader.

It should be appreciated that the unloader and the nesting or stacking guides are configured to assist the unloader and specifically the pallet receiver 200 to receive known bulk material containers (such as the known bulk material container described in the background section of this document and described below). It should be appreciated that the unloader of the present disclosure is configured such that a fork lift can be employed to place a container on top of the unloader and to lift one container from the unloading assembly without damaging the unloader as further described below.

The material director 300 is supported by the pallet receiver 200 and is configured to direct material exiting the bulk material shipping container resting on the unloader to an exit area and specifically through a material unloading port 350. More specifically, material director 300 includes: (a) a front downwardly (e.g., vertically or substantially vertically) extending material directing wall 312 connected to the front pallet support base 202; (b) a rear downwardly slopping material directing wall 316 connected to the rear pallet support base 206; (c) a first downwardly (e.g., angled or sloped) extending side material directing wall 314 connected to the side pallet support base 204; (d) a second downwardly (e.g., angled or sloped) extending material directing side wall 318 connected to the side pallet support base 208; and (e) and a material unloading port 350 formed in the front material directing wall 312.

Figure 1:
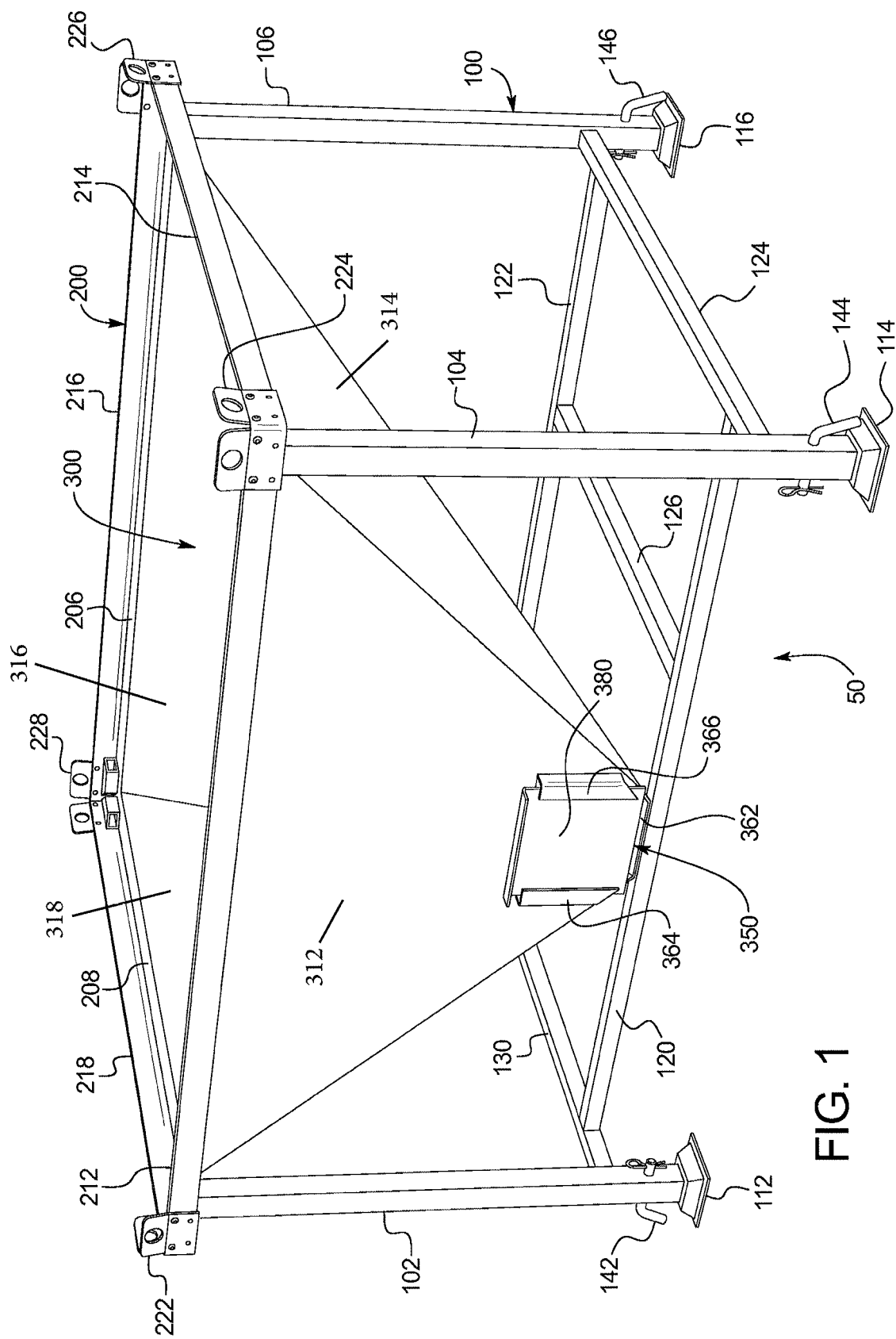
FIG. 1 is a front perspective view of the bulk material shipping container unloader of one embodiment of the present disclosure, shown in a retracted position, and shown with a closure plate coupled to the material unloading port of the material director.
Figure 2:
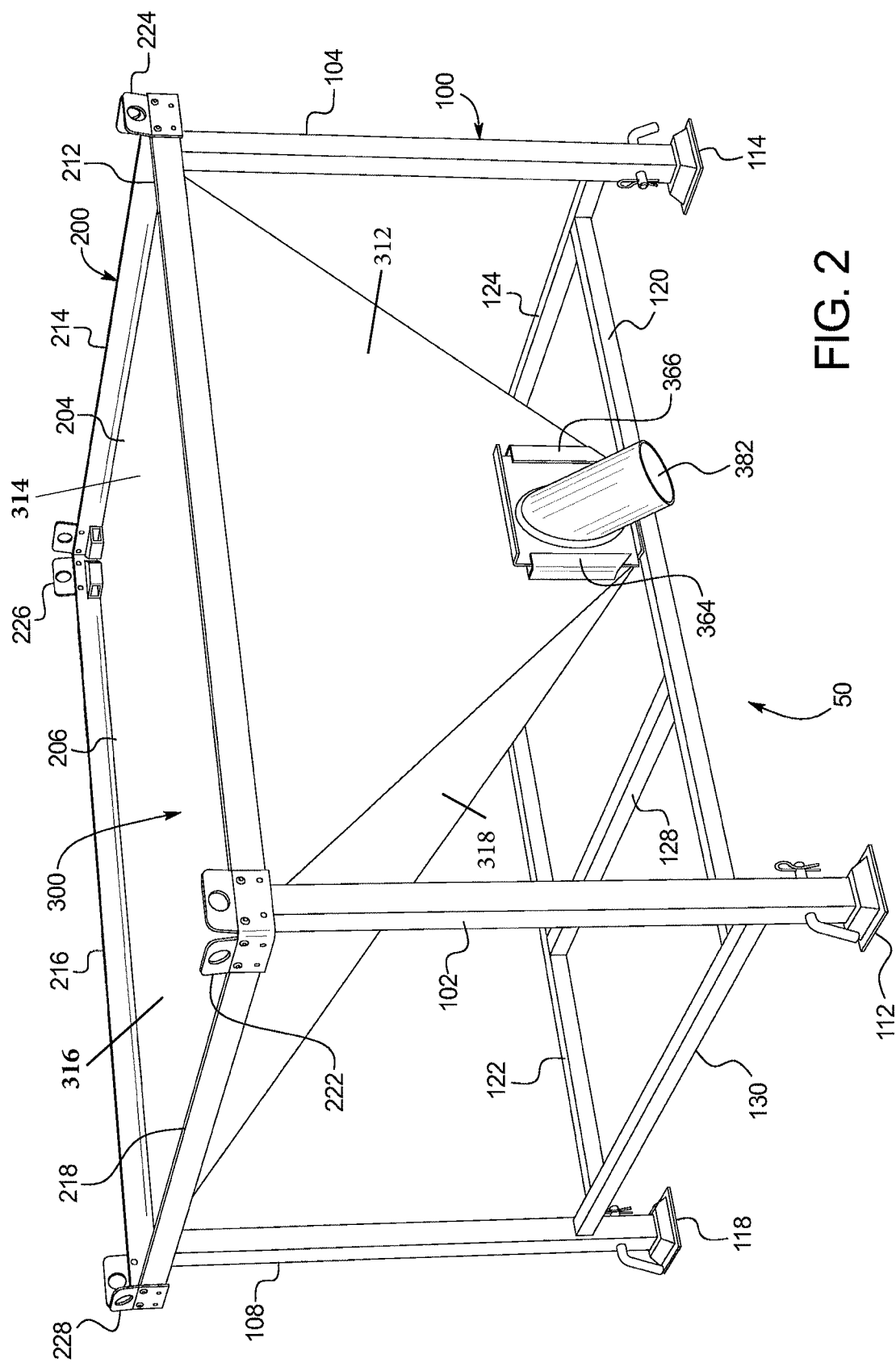
FIG. 2 is a front perspective view of the bulk material shipping container unloader of FIG. 1, shown in a retracted position and shown with an output nozzle coupled to the material unloading port of the material director.
Figure 3:
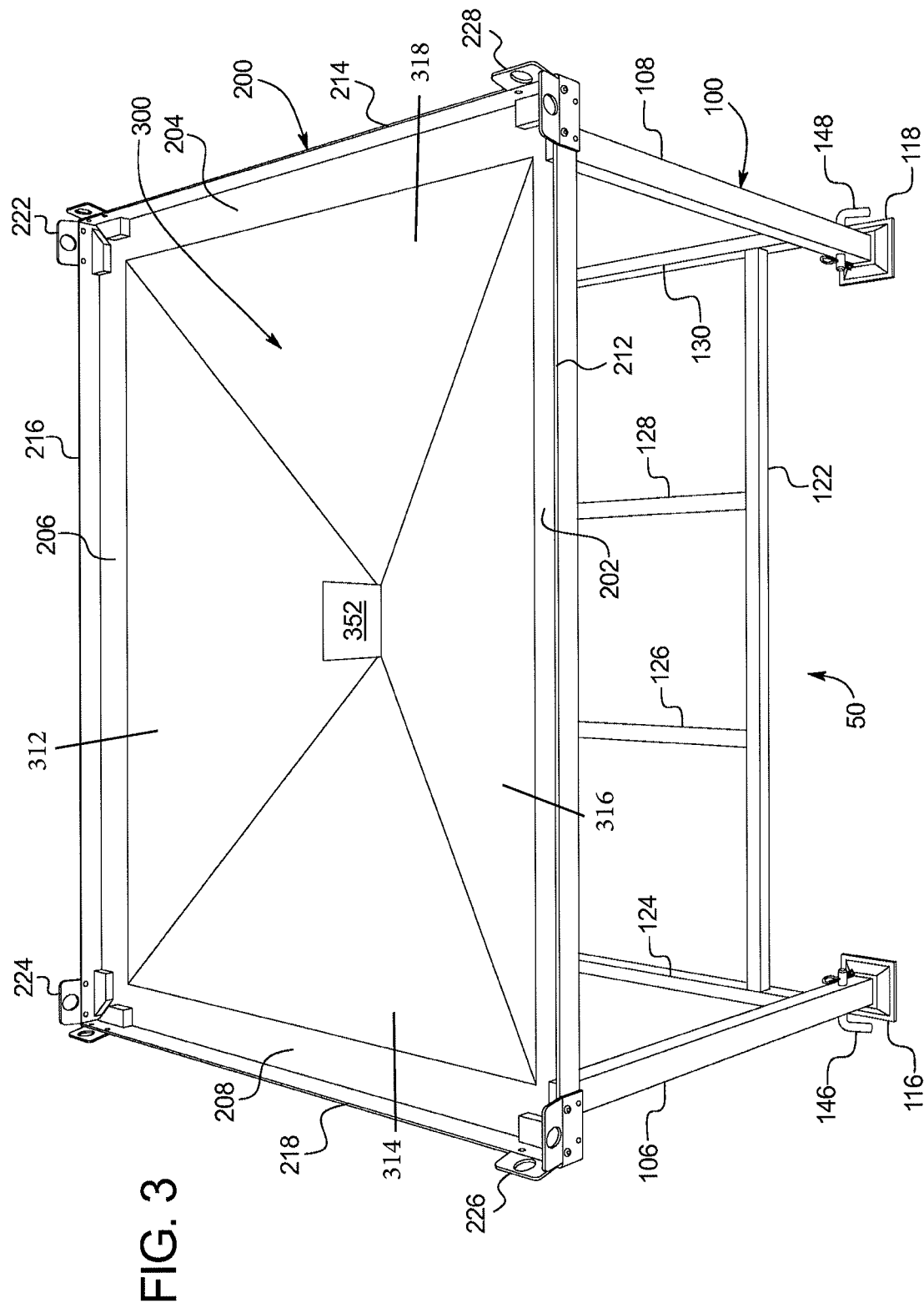
FIG. 3 is a top rear perspective view of the bulk material shipping container unloader of FIG. 1, shown in a retracted position and shown with an open material unloading port of the material director.
Figure 4:
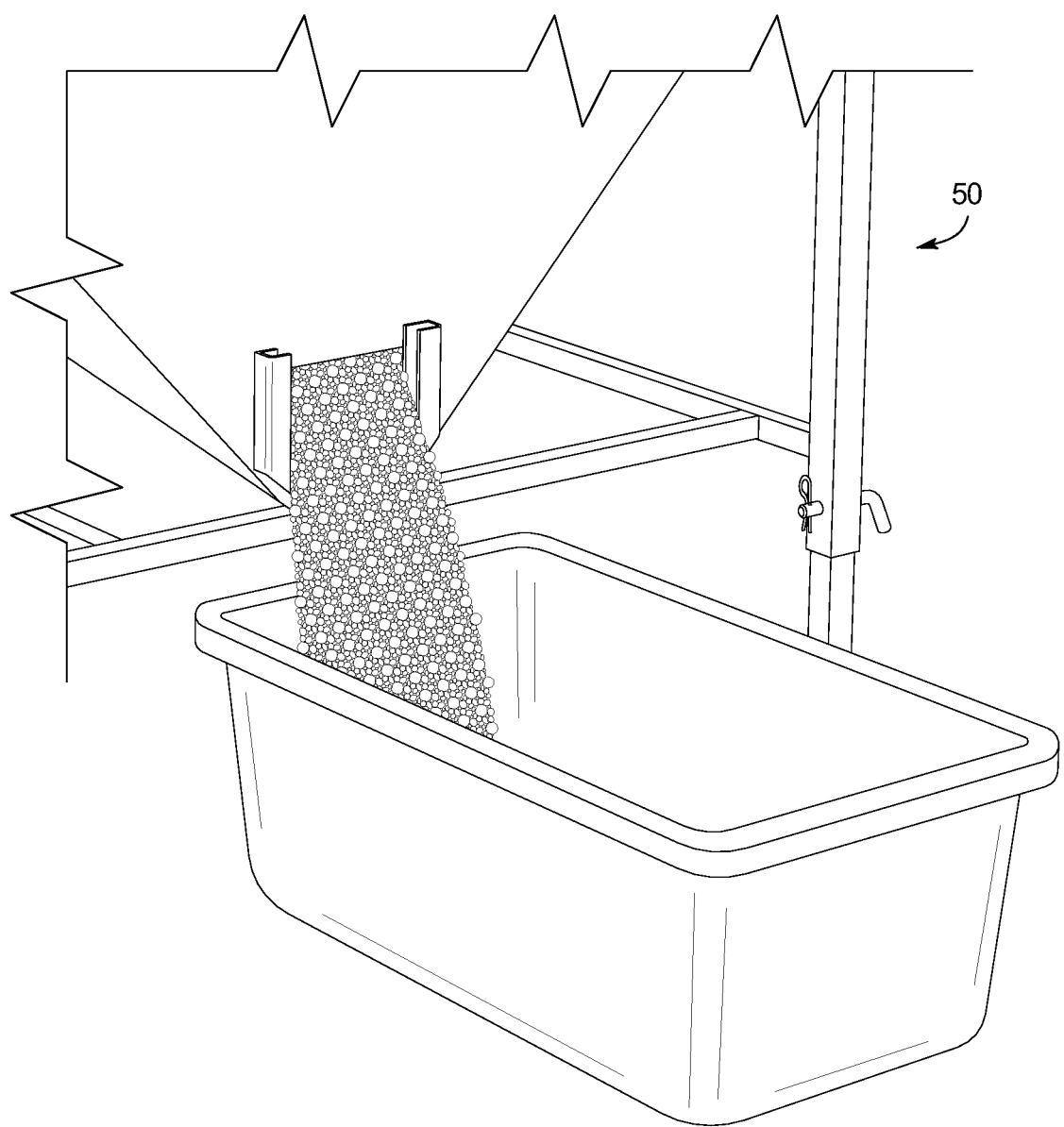
FIG. 4 is an enlarged fragmentary perspective view of the material unloading port of the material director of the bulk material shipping container unloader of FIG. 1, and showing material flowing out through the material unloading port into a bin.
Figure 5:
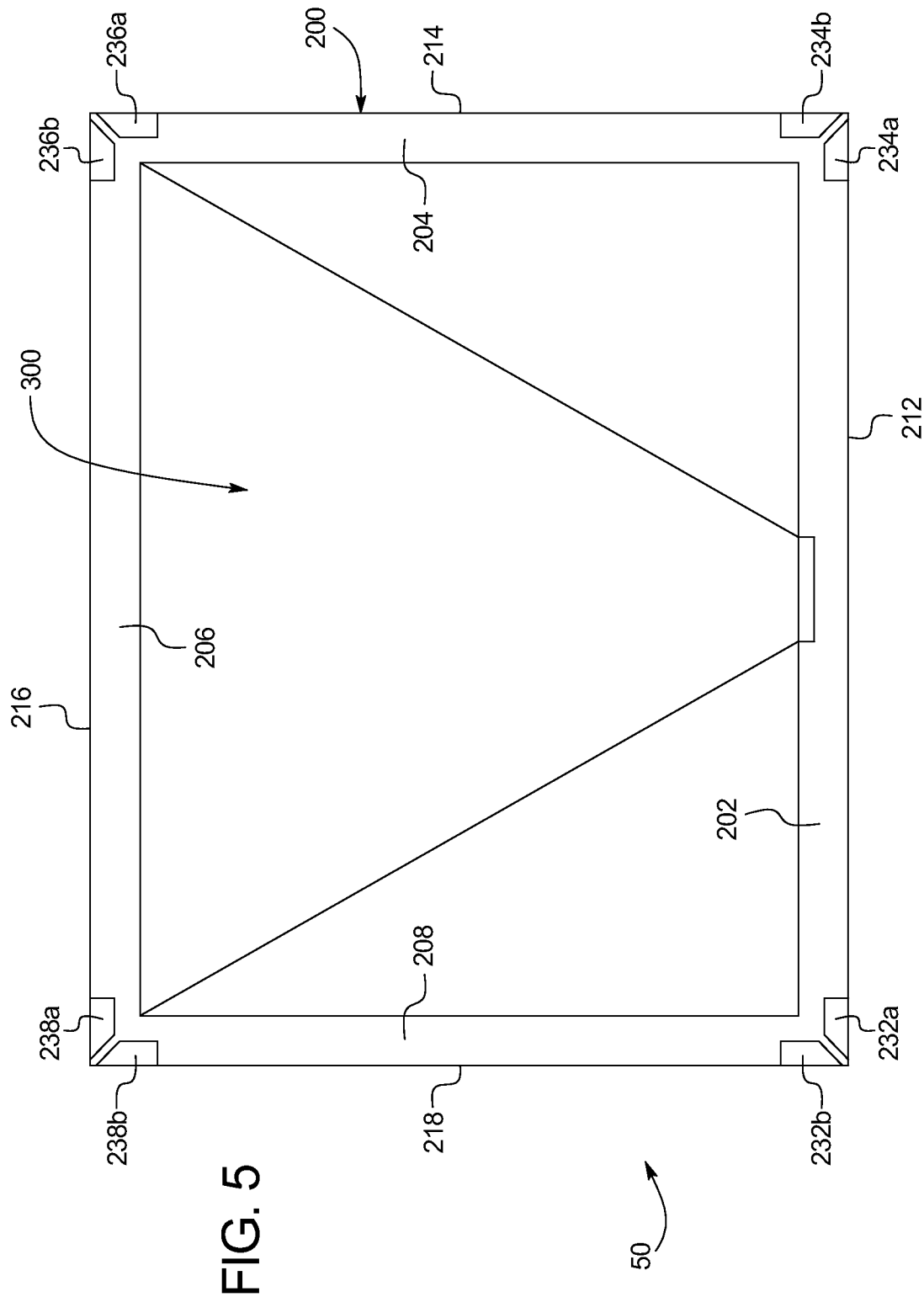
FIG. 5 is a top plan view of the bulk material shipping container unloader of FIG. 1.

The material director 300 additionally includes one or more components that are configured to be coupled with the material unloading port 350. More specifically, the material unloading port 350 includes: (a) a section of the wall 312 which defines an opening 352; (b) a bottom guide or rail 362 positioned below the opening 352; (c) a first side guide or rail 364 positioned on one side of the opening 352; and (d) a second side guide or rail 366 positioned on the other side of the opening. The bottom guide or rail 362, the first side guide or rail 364, and the second side guide or rail 366 are connected to and extend outwardly from the wall 312 and are configured to receive and hold a plurality of different removable components that facilitate operation of the material unloading port 350 and the unloader 50. These components include: (a) a closure plate 380 which is configured to be received and held by the rails 362, 364 and 366 and close the opening 352 as shown in FIG. 1; and (b) a nozzle plate 382 which is configured to be received and held by the rails 362, 364 and 366 as shown in FIG. 2 and to provide a controlled flow (or controlled flow rate) of materials through the opening 352 of the material unloading port 350. It should be appreciated that the present disclosure also contemplates other components such as other nozzle plates with different size and shaped nozzles to regulate material flow or flow rate. It should also be appreciated that the closure plate can be removed and no nozzle plate inserted to facilitate more rapid emptying of the materials through the opening 352 of the material unloading port 350 as generally illustrated in FIG. 4.

In this illustrated embodiment, (a) the front wall 312; (b) the rear wall 316; (c) the first side wall 314; and (d) the second side wall 318 are each made of steel and respectively welded together. In this illustrated embodiment, the rails 362, 364 and 366 are each made of steel and integrally formed from or welded to the front wall 312. In this illustrated embodiment, the closure plate 380 and the nozzle plate 382 are each made of steel. It should be appreciated that these components are made from steel to: (a) facilitate attachment or connection of these components by welding and/or suitable fasteners; (b) provide structural strength and rigidity; (c) facilitate ease of cleaning; (d) facilitate ease of repair; and (e) minimize overall weight of the unloader. However, it should be appreciated that in alternative embodiments, one or more of these components can be made from other suitably strong materials and can be attached in other suitable manners (besides welding).

Turning now specifically to FIGS. 6 and 7, this illustrated embodiment of the bulk material shipping container unloader 50 of the present disclosure is configured to hold one or more bulk material shipping containers 400 and 500 (such as those described in U.S. Patent Publication No. 2012/0103848 and U.S. Patent Publication No. 2012/0152798). In certain versions, these shipping containers have as an expanded position for holding materials during shipping and a retracted position for efficient shipping when the container is not holding materials or when the container is holding a smaller amount of materials. In certain versions, these shipping containers are not expanded or retractable.

Generally, as shown in these published patent applications, the expandable shipping containers each generally includes: (a) a pallet; (b) a bottom compartment; (c) a top compartment; (d) a plurality of top compartment support assemblies; (e) a material unloading assembly; (f) a material loading assembly; and (g) a top compartment extension assembly configured to enable a user to move the top compartment from the retracted position to the expanded position.

It should also be appreciated that the unloader of the present disclosure is configured to hold a shipping container that includes a bottom compartment having: (a) a bottom wall with a selectively openable suitable material release opening; and (b) a door or gate (with a handle) that is movable or slidable from a closed position to a plurality of different partially open positions, and then to a fully open position.

As mentioned above, the unloader of the present disclosure and specifically the pallet receiver 200 is configured to receive a pallet of a shipping container (as generally shown in FIGS. 6 and 7) and specifically configured to take in account that a lifting and moving vehicle such as fork lift will be used to lift and move the shipping container onto the unloader, and thereby provide sufficient spaces for the forks as generally illustrated in FIGS. 6 and 7. In other words, the pallet holding walls 212, 214, 216, and 218 are of a limited height to prevent interference with the fork lift tines which carry the container and place the container on the material unloader 50, regardless of the direction of the fork lift relative to the unloader 50 and the container.

The unloader of the present disclosure is configured to receive a shipping container pallet: (a) that includes a rectangular body having an upper surface, a lower surface, a front edge, a back edge, and opposite side edges; (b) that includes a plurality of legs extending downwardly from the body, where the legs each respectively extend the entire width of the body of the pallet, and where the legs extend downwardly from the central portions of the side ends of the body; and (c) where pallet includes or defines multiple sets of aligned fork lift tine receiving channels.

The unloader of the present disclosure is also configured to receive a shipping container pallet: (a) that includes a rectangular body having an upper surface, a lower surface, a front edge, a back edge, and opposite side edges; (b) a plurality of legs attached to and extending downwardly from the body; (c) a footing attached to and extending downwardly from each of the legs and having an upper surface, a lower surface, a front edge, a back edge, and opposite side edges; and (d) where pallet includes or defines multiple sets of aligned fork lift tine receiving channels, and the footing has a smaller rectangular footprint than the body and the legs to enable the pallet, and specifically legs of the pallet, to sit on the nesting supports of the unloading assembly.

It should thus be appreciated that the material unloader of the present disclosure and specifically the pallet receiver is configured to supports different pallets or pallets that have different configurations and thus different shipping or other containers.

In one embodiment, the unloader of the present disclosure is configured to hold an expandable bulk material shipping container having: (a) a pallet which is approximately 56 inches (142.24 centimeters) by approximately 44 inches (111.76 centimeters) by approximately 6 inches (15.24 centimeters); (b) a bottom compartment which is approximately 56 inches (142.24 centimeters) by approximately 44 inches (111.76 centimeters) by approximately 27 inches (68.58 centimeters); and (c) a top compartment which is approximately 56 inches (142.24 centimeters) by approximately 44 inches (111.76 centimeters) by approximately 27 inches (68.58 centimeters), wherein (d) the container in the retracted position is approximately 56 inches (142.24 centimeters) by approximately 44 inches (111.76 centimeters) by approximately 35 inches (88.90 centimeters); and (e) the container in the expanded position is approximately 56 inches (142.24 centimeters) by approximately 44 inches (111.76 centimeters) by approximately 62 inches (157.48 centimeters). However, it should be appreciated that the unloader of the present disclosure is configured to hold containers of other suitable sizes.

FIGS. 6 and 7 also illustrate that one or more shipping containers (such as containers 400 and 500) can be stacked on the unloader. Container 400 in FIG. 6 is shown having a bottom end 402, a first bottom corner leg 404, a second bottom corner leg 406, a third bottom corner leg 408, and a fourth bottom corner leg 410. Container 500 in FIG. 7 may be similar or identical to container 400. In FIG. 6, when the gate of the container 400 is opened, the material from the container 400 will flow into the material director 300 and out of the material unloading port 350. In FIG. 7, when the gate of the container 400 is opened, the material from the container 400 will flow into the material director 300 and out of the material unloading port 350, and additionally when the gate of the container 500 is opened, the material from the container 500 will flow into the container 400, and then into the material director 300 and out of the material unloading port 350.

It should be understood that modifications and variations may be effected without departing from the scope of the novel concepts of the present disclosure, and it should be understood that this application is to be limited only by the scope of the appended claims.

The invention is claimed as follows:

1. A bulk material shipping container unloader configured to support and facilitate unloading of a bulk material shipping container having a bottom end including a first bottom corner leg, a second bottom corner leg, a third bottom corner leg, and a fourth bottom corner leg, the bulk material shipping container unloader comprising:
   a supporter including: (i) a first upstanding leg, (ii) a second upstanding leg, (iii) a third upstanding leg, (iv) a fourth upstanding leg, and (v) a plurality of leg stabilizers that are each fixedly connected to and extend from one of the upstanding legs;
   a bottom end receiver fixedly connected to and supported by the first upstanding leg, the second upstanding leg, the third upstanding leg, and the fourth upstanding leg of the supporter, the bottom end receiver configured to support the bottom end of the bulk material shipping container, the bottom end receiver including:
      (i) a plurality of support bases including a front support base, a rear support base spaced apart from the front support base, a first side support base fixedly connected to the front support base and the rear support base, and a second side support base spaced apart from the first side support base and fixedly connected to the front support base and the rear support base,
      (ii) a plurality of upstanding walls each fixedly connected to and extending above a corresponding support base of the plurality of support bases and configured to engage the bulk material shipping container, each of the plurality of upstanding walls extending upwardly from an outer portion of the corresponding support base, and
      (iii) a plurality of nesting supports fixedly connected to the plurality of support bases, the plurality of nesting supports including a first nesting support configured to contact and provide vertical support to the first bottom corner leg of the bulk material shipping container, a second nesting support configured to contact and provide vertical support to the second bottom corner leg of the bulk material shipping container, a third nesting support configured to contact and provide vertical support to the third bottom corner leg of the bulk material shipping container, and a fourth nesting support configured to contact and provide vertical support to the fourth bottom corner leg of the bulk material shipping container; and a material director fixedly connected to the bottom end receiver by welding and supported by the bottom end receiver, the material director defining an upper opening and a lower opening, and including:
(i) a first downwardly extending material directing wall,
(ii) a second downwardly extending material directing wall,
(iii) a first downwardly extending material directing side wall fixedly connected to the first downwardly extending material directing wall and the second downwardly extending material directing wall, and
(iv) a second downwardly extending material directing side wall fixedly connected to the first downwardly extending material directing wall and the second downwardly extending material directing wall, and
wherein the first downwardly extending material directing wall, the second downwardly extending material directing wall, the first downwardly extending material directing side wall, and the second downwardly extending material directing side wall define a chamber having a fixed shape configured to receive material from the bulk material shipping container supported by the bottom end receiver and to direct the received material through the chamber.

2. The bulk material shipping container unloader of claim 1, wherein one of the downwardly extending material directing walls defines a material unloading port that defines the lower opening.

3. The bulk material shipping container unloader of claim 1, which includes a nozzle connected to one of the downwardly extending material directing walls.

4. The bulk material shipping container unloader of claim 1, wherein the first downwardly extending material directing side wall and the second downwardly extending material directing side wall extend downwardly toward each other.

5. The bulk material shipping container unloader of claim 1, wherein the first downwardly extending material directing side wall extends downwardly at an angle toward two of the upstanding legs of the supporter, and wherein the second downwardly extending material directing side wall extends downwardly at an angle toward two of the upstanding legs of the supporter.

6. The bulk material shipping container unloader of claim 1, wherein the first downwardly extending material directing side wall extends downwardly at an angle toward two of the upstanding legs of the supporter, wherein the second downwardly extending material directing side wall extends downwardly at an angle toward two of the upstanding legs of the supporter, and wherein the second downwardly extending material directing wall extends downwardly at an angle toward two of the upstanding legs of the supporter.

7. The bulk material shipping container unloader of claim 1, wherein the first downwardly extending material directing wall, the second downwardly extending material directing wall, the first downwardly extending material directing side wall, and the second downwardly extending material directing side wall are configured to direct the received material through the chamber and toward an area exterior to two of the upstanding legs of the supporter.

8. The bulk material shipping container unloader of claim 1, wherein the first downwardly extending material directing wall extends vertically downwardly.

9. The bulk material shipping container unloader of claim 1, wherein the first upstanding leg, the second upstanding leg, the third upstanding leg, the fourth upstanding leg, and the plurality of leg stabilizers of the supporter are supported by movable members.

10. The bulk material shipping container unloader of claim 1, which includes a moveable portion attached to one of the downwardly extending material directing walls.

11. A bulk material shipping container unloader configured to support and facilitate unloading of a bulk material shipping container having a bottom end including a first bottom corner leg, a second bottom corner leg, a third bottom corner leg, and a fourth bottom corner leg, the bulk material shipping container unloader comprising:
a supporter including: (i) a steel first upstanding leg, (ii) a steel second upstanding leg, (iii) a steel third upstanding leg, (iv) a steel fourth upstanding leg, and (v) a plurality of steel leg stabilizers that are each welded to and extend from one of the upstanding legs;
a steel bottom end receiver welded to and supported by the first upstanding leg, the second upstanding leg, the third upstanding leg, and the fourth upstanding leg of the supporter, the bottom end receiver configured to support the bottom end of the bulk material shipping container, the bottom end receiver including:
(i) a plurality of support bases including a steel front support base, a steel rear support base spaced apart from the front support base, a steel first side support base welded to the front support base and the rear support base, and a steel second side support base spaced apart from the first side support base and welded to the front support base and the rear support base,
(ii) a plurality of steel upstanding walls each welded to and extending above a corresponding support base of the plurality of support bases and configured to engage the bulk material shipping container, each of the plurality of steel upstanding walls extending upwardly from an outer portion of the corresponding support base, and
(iii) a plurality of nesting supports fixedly connected to the plurality of support bases, the plurality of nesting supports including a first nesting support configured to contact and provide vertical support to the first bottom corner leg of the bulk material shipping container, a second nesting support configured to contact and provide vertical support to the second bottom corner leg of the bulk material shipping container, a third nesting support configured to contact and provide vertical support to the third bottom corner leg of the bulk material shipping container, and a fourth nesting support configured to contact and provide vertical support to the fourth bottom corner leg of the bulk material shipping container; and a steel material director fixedly welded to the bottom end receiver and supported by the bottom end receiver, the material director defining an upper opening and a lower opening, and including:
(i) a steel first downwardly extending material directing wall,
(ii) a steel second downwardly extending material directing wall,
(iii) a steel first downwardly extending material directing side wall welded to the first downwardly extending material directing wall and the second downwardly extending material directing wall, and (iv) a steel second downwardly extending material directing side wall welded to the first downwardly extending material directing wall and the second downwardly extending material directing wall, and wherein the first downwardly extending material directing wall, the second downwardly extending material directing wall, the first downwardly extending material directing side wall, and the second downwardly extending material directing side wall define a chamber having a fixed shape configured to receive material from the bulk material shipping container supported by the bottom end receiver and to direct the received material through the chamber.

12. The bulk material shipping container unloader of claim 11, wherein one of the downwardly extending material directing walls defines a material unloading port that defines the lower opening.

13. The bulk material shipping container unloader of claim 11, which includes a nozzle connected to one of the downwardly extending material directing walls.

14. The bulk material shipping container unloader of claim 11, wherein the first downwardly extending material directing side wall and the second downwardly extending material directing side wall extend downwardly toward each other.

15. The bulk material shipping container unloader of claim 11, wherein the first downwardly extending material directing side wall extends downwardly at an angle toward two of the upstanding legs of the supporter, and wherein the second downwardly extending material directing side wall extends downwardly at an angle toward two of the upstanding legs of the supporter.

16. The bulk material shipping container unloader of claim 11, wherein the first downwardly extending material directing side wall extends downwardly at an angle toward two of the upstanding legs of the supporter, wherein the second downwardly extending material directing side wall extends downwardly at an angle toward two of the upstanding legs of the supporter, and wherein the second downwardly extending material directing wall extends downwardly at an angle toward two of the upstanding legs of the supporter.

17. The bulk material shipping container unloader of claim 11, wherein the first downwardly extending material directing wall, the second downwardly extending material directing wall, the first downwardly extending material directing side wall, and the second downwardly extending material directing side wall are configured to direct the received material through the chamber and toward an area exterior to two of the upstanding legs of the supporter.

18. The bulk material shipping container unloader of claim 11, wherein the first downwardly extending material directing wall extends vertically downwardly.

19. The bulk material shipping container unloader of claim 11, wherein the first upstanding leg, the second upstanding leg, the third upstanding leg, the fourth upstanding leg, and the plurality of leg stabilizers of the supporter are supported by movable members.

20. The bulk material shipping container unloader of claim 11, which includes a moveable portion attached to one of the downwardly extending material directing walls.

21. The bulk material shipping container unloader of claim 11, wherein the plurality of upstanding walls fixedly connected to and extending above the plurality of support bases each extend above the plurality of support bases and between a respective two of the first, second, third, and fourth upstanding legs.

22. The bulk material shipping container unloader of claim 1, wherein the plurality of upstanding walls fixedly connected to and extending above the plurality of support bases each extend above the plurality of support bases and between a respective two of the first, second, third, and fourth upstanding legs.

\* \* \* \* \*